United States Patent [19]
Essop

[11] Patent Number: 5,149,434
[45] Date of Patent: Sep. 22, 1992

[54] GRAVITY SEPARATOR

[76] Inventor: Saleam Essop, 97 Sir Kurma Reddi Road, Clairwood Natal, South Africa

[21] Appl. No.: 661,069

[22] Filed: Feb. 25, 1991

[51] Int. Cl.⁵ .............................................. C02F 1/40
[52] U.S. Cl. .................... 210/521; 210/532.1; 210/540
[58] Field of Search .................... 210/521, 532.1, 536, 210/538, 540, 252

[56] References Cited

U.S. PATENT DOCUMENTS

| | | | |
|---|---|---|---|
| 322,817 | 7/1885 | Garrett | 210/540 |
| 366,148 | 7/1887 | Brown | 210/540 |
| 745,519 | 1/1903 | Pravicha et al. | 210/521 |
| 995,521 | 6/1911 | Buhr | 210/521 |
| 3,933,654 | 1/1976 | Middlebeek | 210/521 |
| 4,554,074 | 11/1985 | Broughton | 210/521 |

Primary Examiner—Stanley S. Silverman
Assistant Examiner—Christopher Upton
Attorney, Agent, or Firm—Bierman and Muserlian

[57] ABSTRACT

A gravity separator for separating oil and water. The separator comprises a separating tank, a discharge tank and apertures for oil and water provided at different levels relative to a base plane. Each of the apertures are provided with conduits that extend in the direction of the other apertures, and parallel to the base plane. Separation of the oil and water from a mixture of oil and water takes place even if the separator is tilted. The separator can be used on board ships, and can be used for clearing oil spills in rough seas.

3 Claims, 3 Drawing Sheets

GRAVITY SEPARATOR

BACKGROUND AND OBJECT OF THE INVENTION

The invention relates to a liquid mixture separating apparatus.

In particular, this invention relates to a device for separating, by gravity, the immiscible constituents of a liquid mixture, the constituents being of different densities.

Gravity liquid separators work on the principle that the immiscible constituent of a liquid mixture having a lower density floats onto the top of the constituent having a higher density. The two constituents are discharged through separate discharge outlets.

The location of the discharge outlet for the constituent of a lower density is relatively higher than the location of the discharge outlet for the constituent of a higher density, the locations being relative to a horizontal base.

In the case of fixed devices, and in the case of devices fixed on ground level, the height differential between the locations of the discharge outlets for the respective constituents of the mixture, is maintained and separation takes place as a result of the constituent of a higher density settling to a lower level and the constituent of a lower density floating thereon.

However, when such gravity separators are mounted on ships, wave action causes the ships to roll and pitch. This causes the consequent tilting of the separators mounted on the ships. This tiling of the separator may cause disturbance in the relative height differential between the discharge outlets and may cause the constituent of a higher density to rise above the level of the discharge outlet provided for the constituent of the lower density. This disturbance can be very significant in oil spill recovery operations as it prevents proper separation of the oil and water.

The present invention is directed towards an apparatus for separating the immiscible constituents of a liquid mixture and, particularly, for separating oil and water with the help of a gravity separator that can separate the constituents even in conditions where the separator is subjected to moderate tilting and pitching movements.

A particular object is to provide a horizontal separator vessel which can be mounted on a ship and which can separate oil and water even when the ship is in a rough sea environment.

These objects as well as other and more specific objects of the invention will be described in the following description and claims, taken in conjunction with the attached drawings.

SUMMARY OF THE INVENTION

According to this invention there is provided an apparatus for separating, by gravity, a mixture of oil and water which includes a separating tank in communication with a discharge tank, an inlet in the separating tank for introducing a mixture of oil and water into the apparatus, at least one first discharge aperture for discharge of oil separated from the mixture in the apparatus and at least one second discharge aperture for the water separated from the mixture in the apparatus, the level of the said first discharge aperture being higher than the level of the said second discharge aperture relative to an operative horizontal base plane of the apparatus; characterized in that the said first discharge aperture is provided with a first conduit generally parallel to the said base plane and extending towards the said second discharge aperture and the said second discharge aperture is provided with a second conduit generally parallel to the said base plane and extending towards the said first discharge aperture, the said first and second conduits having, at their extremities, first and second openings respectively, the said first opening being at a relatively higher level in respect to the said second opening in relation to the said base plane.

Preferably, the first and second conduits have branches which extend through the first and second apertures into the separating and discharge tanks. Typically, the conduits may extend half way into the respective tanks.

DESCRIPTION OF VIEWS

The invention will now be described with reference to the accompanying drawings, in which FIG. 1 is a schematic sectional view of a separating apparatus in accordance with this invention in an operatively horizontal position;

FIG. 2 is a schematic sectional view of the separating apparatus of FIG. 1 in a tilted position; and FIG. 3 is a schematic plan view of the separating apparatus of FIG. 1.

DETAILED DESCRIPTION OF THE DRAWINGS

Figure 1:
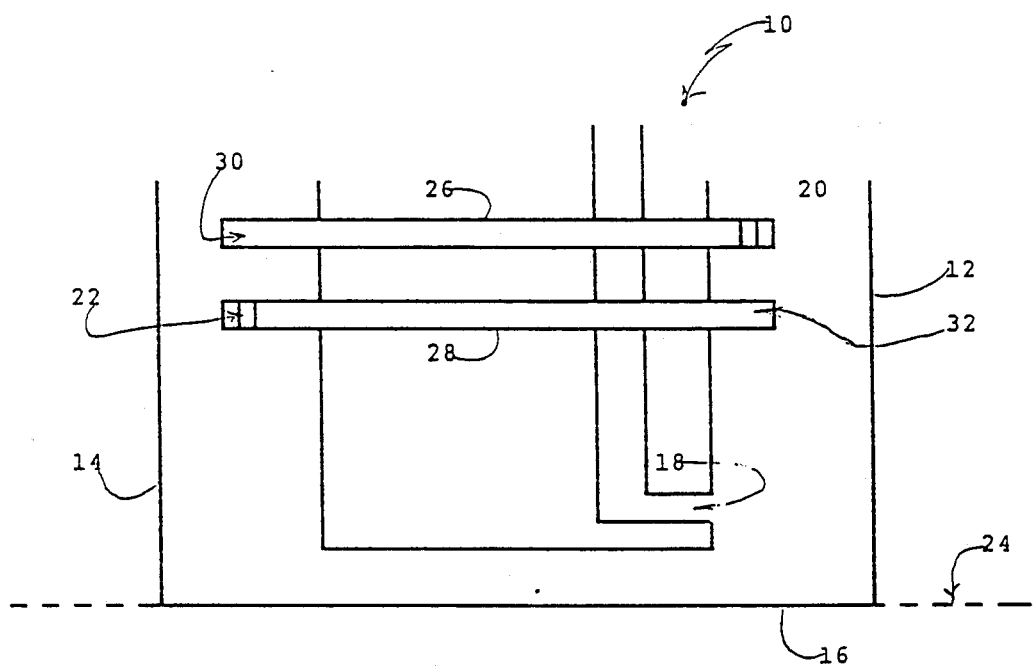

Referring to the drawings, and first to FIG. 1, a horizontal gravity separator embodying the principles of the invention is indicated generally by the reference numeral 10. The separator 10 comprises a separating tank 12, a discharge tank 14, a communication passage 16 connecting the tanks 12 and 14, an inlet 18 for introducing a mixture of oil and water into the separating tank, a first discharge aperture 20 for discharging oil after separation and a second discharge aperture 22 for discharging water after separation. As seen in FIG. 1, the level of the first discharge aperture 20 is higher than the level of the second discharge aperture 22 relative to a horizontal base plane 24.

The first discharge aperture 20 of the separator 10 is further provided with a conduit 26 extending therefrom in the direction of the second discharge aperture 22. Similarly, the second discharge aperture 22 is provided with a conduit 28 extending therefrom and in the direction of the first discharge aperture 20. As seen in FIG. 1, both conduits 26 and 28 are parallel to the horizontal base plane 24. Also, as can be seen in FIG. 1, the level of the conduit 26 is relatively higher than the level of the conduit 28 relative to the base plane 24. The conduit 26 has a discharge opening 30 whereas the conduit 28 has a discharge opening 32.

Figure 3:
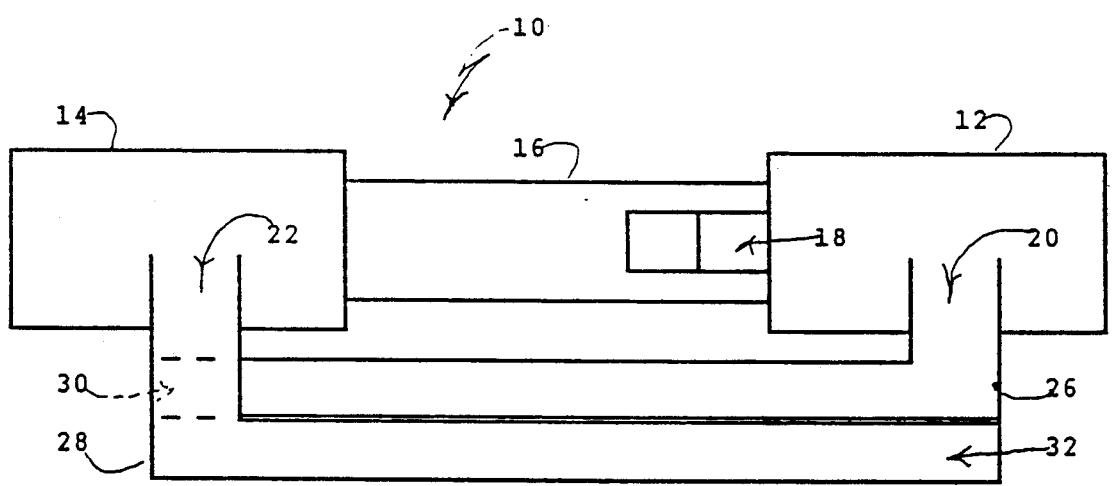

As seen in FIG. 3 of the drawings, the conduit 26 extends inwardly into the separating tank 12 whereas the conduit 28 extends inwardly into the discharge tank 14.

The separator 10 may be fabricated out of sheet metal or may be moulded out of a synthetic polymeric material or fibre glass.

In use, a mixture of oil and water is introduced into the separator 10 through the mixture inlet 18. The terms "oil" and "water" are used generally to represent two or more immiscible constituents of a mixture having different densities, "oil" representing the constituent of a lower density and "water" representing the constituent of a higher density.

Separation of the mixture takes place in the separating tank 12. Oil rises to the top until it reaches the level of the first discharge aperture 20 and enters the conduit 26. Oil is discharged through the discharge opening 30. Meanwhile, water passes through the communication passage 16 into the discharge tank 14, rises up to the level of the second discharge aperture 22, enters the conduit 28 and is discharged through the discharge opening 32.

Figure 2:
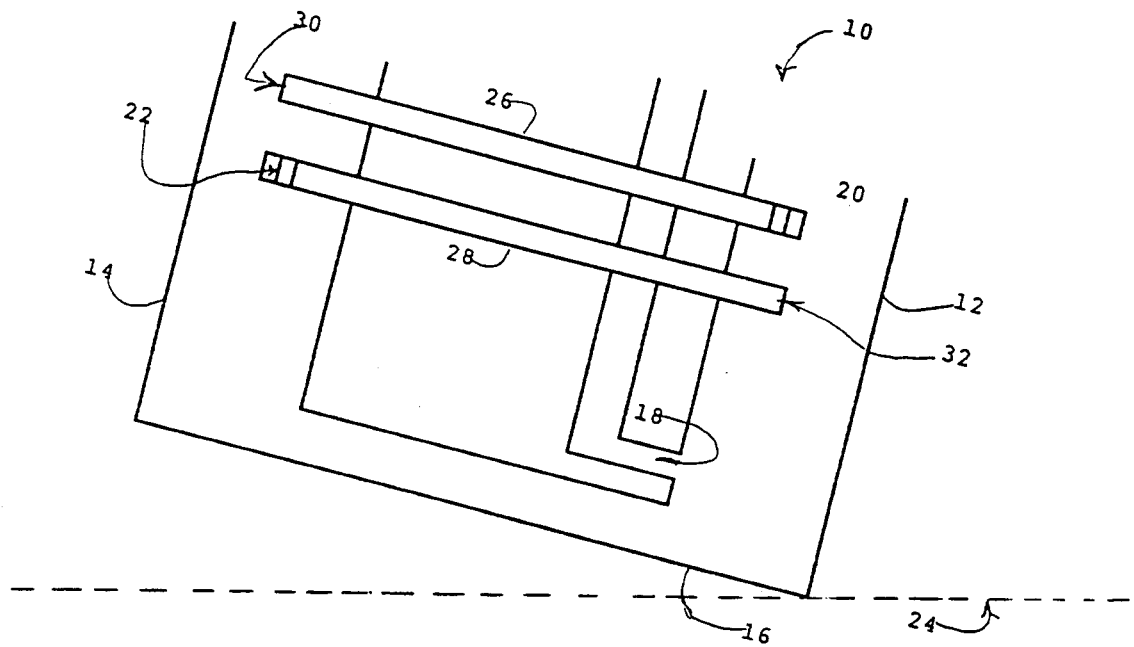

The advantage of the conduits 26 and 28 is apparent from the illustration in FIG. 2 of the drawings. As seen in FIG. 2, which represents the tilted position of the separator 10, because of the tilt in the separator 10 away from the horizontal base plane 24, the discharge opening 30 is displaced relatively downwards whereas the discharge opening 32 is displaced relatively upwards, both relative to the base plane 24. This displacement maintains relative height differential between the discharge openings 30 and 32, even if the separator 10 is displaced from its horizontal base plane 24 through sixty degrees. Separation, therefore, will continue even if the apparatus is tilted. It can be easily understood that a tilt in the opposite direction than that shown in FIG. 2 will, in fact, increase the height differential between the levels of the first and second discharge apertures 20 and 22.

Thus, in any event, separation takes place in all practical positions of the separator 10 in normal working conditions on board a ship.

The separator 10 of the invention is therefore particularly suited for use on ships and other vessels out at sea, where wave action will cause the separator to be displaced as a result of the rolling and pitching of the ship. The apparatus therefore is suited for separating a mixture of oil and water caused by an oil spill at sea.

I claim:
1. An apparatus for separating, by gravity, a mixture of oil and water comprising a separating tank, a discharge tank, a communication passage connecting a lower portion of said separating tank with a lower portion of said discharge tank, an inlet in the separating tank for introducing a mixture of oil and water into the apparatus, at least one first discharge aperture in an upper portion of the separating tank for discharge of oil separated from the mixture in the apparatus and at least one second discharge aperture in an upper portion of the discharge tank for the water separated from the mixture in the apparatus, the level of the said first discharge aperture being higher than the level of the said second discharge aperture relative to an operative horizontal base plane of the apparatus wherein the said first discharge aperture is provided with a first conduit generally parallel to the said base plane and extending to an extremity approximately directly above the location of the said second discharge aperture and the said second discharge aperture is provided with a second conduit generally parallel to the said base plane and extending a location approximately directly below the location of the said first discharge aperture, the said first and second conduits having, at their extremities, first and second openings respectively, the said first opening being at a relatively higher level in respect to the said second opening in relation to the said base plane.

2. An apparatus for separating, by gravity, a mixture of oil and water according to claim 1, in which the first and second conduits have branches which extend through the first and second apertures into the said separating and discharge tanks.

3. An apparatus for separating, by gravity, a mixture of oil and water according to claim 2, in which the conduits extend half way into the respective tanks.

* * * * *